United States Patent
Sun et al.

(10) Patent No.: US 9,435,921 B2
(45) Date of Patent: Sep. 6, 2016

(54) BLAZED GRATING SPECTRAL PURITY FILTER AND METHODS OF MAKING SUCH A FILTER

(71) Applicant: GLOBALFOUNDRIES Inc., Grand Cayman (KY)

(72) Inventors: Lei Sun, Albany, NY (US); Obert Reeves Wood, II, Loudonville, NY (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 372 days.

(21) Appl. No.: 13/958,190

(22) Filed: Aug. 2, 2013

(65) Prior Publication Data
US 2015/0036978 A1  Feb. 5, 2015

(51) Int. Cl.
*G02B 5/20* (2006.01)
*G02B 1/12* (2006.01)

(52) U.S. Cl.
CPC . *G02B 5/20* (2013.01); *G02B 1/12* (2013.01); *G02B 5/203* (2013.01)

(58) Field of Classification Search
CPC .................................................. G02B 5/20
See application file for complete search history.

(56) References Cited

U.S. PATENT DOCUMENTS

| | | | | |
|---|---|---|---|---|
| 3,542,453 A | * | 11/1970 | Kantor | G02B 5/1857 216/24 |
| 4,915,463 A | * | 4/1990 | Barbee, Jr. | G02B 5/1838 359/350 |
| 8,137,869 B2 | * | 3/2012 | Bakker | G03F 7/70575 359/566 |
| 8,331,027 B2 | * | 12/2012 | Padmore | B29D 11/0073 356/328 |

OTHER PUBLICATIONS

Chkhalo et al., "Freestanding multilayer films for application as phase retarders and spectral purity filters in the soft X-ray and EUV ranges," Proceedings of SPIE, 8076:80760O-1-11, 2011.
Flora et al., "Krypton as filter for ions, debris and useless radiation in EUV projection lithography systems," Proceedings of SPIE, 4504:77-86, 2001.
Heilmann et al., "Advanced in reflection grating technology for Constellation-X," Proceedings of SPIE, 5168:271-282, 2004.
Kierey et al., "EUV spectral purity filter: optical and mechanical design, gratings fabrication, and testing," Proceedings of SPIE, 5193:70-78, 2004.
Liddle et al., "Nanoscale topography control for the fabrication of advanced diffractive optics," J. Vac. Sci. Technol. B, 21:2980-2984, 2003.
Mbanaso et al., "Out-of-band radiation mitigation at 10.6 um by molecular absorbers in laser-produced plasma extreme ultraviolet sources," J. Micro/Nanolith. MEMS MOEMS, 11:021116-1-6, 2012.

(Continued)

*Primary Examiner* — Daniel Petkovsek
(74) *Attorney, Agent, or Firm* — Amerson Law Firm, PLLC (57) ABSTRACT

A novel blazed grating spectral filter disclosed herein includes a multilayer stack of materials that is formed on a wedge-shaped substrate wherein the upper surface of the substrate is oriented at an angle relative the bottom surface of the substrate and wherein the angle corresponds to the blaze angle of the blazed grating filter. Various methods of forming such a filter are also disclosed such as, for example, performing a planarization process in a CMP tool to define the wedge-shaped substrate, thereafter forming the multilayer stack of materials above the upper planarized surface of the substrate and etching recesses into the multilayer stack.

22 Claims, 5 Drawing Sheets

(56) References Cited

OTHER PUBLICATIONS

Medvedev et al., "Infrared antireflective filtering for extreme ultraviolet multilayer Bragg reflectors," Optics Letters, 37:1169-1171, 2012.
Naulleau et al., "Fabrication of high-efficiency multilayer-coated binary blazed gratings in the EUV regime," Optics Communications, 200:27-34, 2001.
Seely et al., "Off-Plane Grazing Incidence Constellation-X Grating Calibrations using Polarized Synchrotron Radiation and PCGRATE Code Calculations" (no date, no publication information).
Soer et al., "Grid spectral purity filters for suppression of infrared radiation in laser-produced plasma EUV sources," Proceedings of SPIE, 7271:72712Y-1-9, 2009.

* cited by examiner

BLAZED GRATING SPECTRAL PURITY FILTER AND METHODS OF MAKING SUCH A FILTER

BACKGROUND OF THE INVENTION

1. Field of the Invention

Generally, the present disclosure relates to the manufacture of semiconductor devices, and, more specifically, to various embodiments of a novel blazed grating spectral purity filter and various methods of making such a filter.

2. Description of the Related Art

The fabrication of advanced integrated circuits, such as CPU's, storage devices, ASIC's (application specific integrated circuits) and the like, requires the formation of a large number of circuit elements in a given chip area according to a specified circuit layout, wherein field effect transistors (NMOS and PMOS transistors) represent one important type of circuit element used in manufacturing such integrated circuit devices. In general, integrated circuit devices are formed by performing a number of process operations in a detailed sequence or process flow. Such process operations typically include deposition, etching, ion implantation, photolithography and heating processes that are performed in a very detailed sequence to produce the final device.

Device designers are under constant pressure to increase the operating speed and electrical performance of transistors and integrated circuit products that employ such transistors. One technique that continues to be employed to achieve such results is the reduction in size of the various devices, such as the gate length of the transistors. The gate length (the distance between the source and drain regions) on modern transistor devices may be approximately 30-50 nm, and further downward scaling is anticipated in the future. Manufacturing devices that are so small is a very difficult challenge, particularly for some processes, such as photolithography tools and techniques.

A typical photolithography process generally involves the steps of: (1) applying a layer of photoresist (a light-sensitive material) above a wafer or substrate, typically accomplished by a spin-coating process; (2) pre-baking (or soft-baking) the layer of photoresist at a temperature of approximately 90-120° C. to reduce the level of solvents in the layer of photoresist and to improve the adhesion characteristics of the photoresist; (3) performing an exposure process, wherein a pattern on a reticle or mask is projected onto the layer of photoresist used in a stepper tool to create a latent image in the layer of photoresist; (4) performing a post-exposure bake on the layer of photoresist at a temperature approximately 5-15° C. higher than the pre-bake process; (5) performing a develop process to turn the latent image in the layer of photoresist into the final resist image; and (6) performing a post-bake process (or hard-bake) at a temperature of approximately 125-160° C. to remove residual solids and to improve adhesion of the patterned photoresist mask. These process steps result in a "post-litho" patterned etch mask that may be used for a variety of purposes, e.g., as an etch mask to form trench/hole type features in an underlying layer of insulating material. The above processes are well known to those skilled in the art and, thus, will not be described herein in any greater detail.

By way of background, photolithography tools and systems typically include a source of radiation at a desired wavelength, an optical system and, as noted above, a mask or reticle that contains a pattern that is desired to be formed on a wafer. Radiation is provided through or reflected off the mask or reticle to form an image on a light-sensitive layer of photoresist material that is formed above a semiconductor wafer. The radiation used in such systems may be light, such as ultraviolet light, deep ultraviolet light (DUV), vacuum ultraviolet light (VUV), extreme ultraviolet light (EUV), etc. The radiation may also be x-ray radiation, e-beam radiation, etc. Currently, most of the photolithography systems employed in semiconductor manufacturing operations are so-called deep ultraviolet (DUV) systems that generate radiation at a wavelength of 248 nm or 193 nm. However, the capabilities and limits of traditional DUV photolithography systems are being tested as device dimensions continue to shrink. This has led to the development of so-called extreme ultraviolet systems, i.e., EUV systems, that use radiation with a much shorter wavelength, e.g., less than 20 nm and in some particular cases about 13.5 nm. One fundamental difference between DUV systems and EUV systems involves the structure of the reticle, and the manner in which light interacts with the reticle. In a DUV system, light (from the light source) passes through the reticle and irradiates a layer of light sensitive material. In contrast, in an EUV system, light (from the light source) is reflected off of a multi-layer mask onto the light sensitive material.

As device dimensions continue to shrink, it is believed the EUV photolithography systems will be required to make future generation devices. However, there are some practical problems associated with effectively implementing EUV systems into production manufacturing environments. For example, low source power and excessive defect generation are two problems that need to be addressed to allow implementation of cost-effective EUV systems.

The typical radiation source in an EUV system emits multiple wavelengths of energy, such as, for example, 10.6 μm, 13.5 nm, 193 nm, 248 nm, etc. EUV systems are designed to use radiation at a wavelength of about 13.5 nm. Radiation at a wavelength of 10.6 μm is typically referred to as infra-red (IR) radiation. Radiation at wavelengths other than 13.5 nm and 10.6 μm is typically referred to as out-of-band (OoB) light or radiation. Thus, given the multiple wavelengths in the radiation source for an EUV system, a spectral purity filter (SPF) must be employed to filter out the undesirable wavelengths of light, i.e., to filter out the IR and OoB wavelengths. If the IR and OoB wavelengths are not effectively blocked, the EUV system may not be as effective in forming patterned features because such undesirable wavelengths reduce the contrast during the EUV photolithography process. However, when filtering the undesirable IR and OoB wavelengths, some of the desirable 13.5 nm wavelength light is also filtered out. Accordingly, what is desired is a spectral purity filter that allows a high transmission of EUV light and a low transmission of the IR and OoB wavelengths.

There are various known techniques and systems that are used in an attempt to filter the IR and OoB wavelengths while allowing transmission of the desirable EUV light. Typically, such known techniques and systems try to block the IR and OoB wavelengths separately. In general, there is more energy in the IR band and, accordingly, absorption of IR radiation tends to generate a lot of heat. Thus, heat management is an important issue when it comes to designing and implementing a spectral purity filter. Moreover, the inventors are not aware of any prior art filtering systems that block both the IR and OoB wavelengths while at the same time providing acceptable levels of heat management.

One type of spectral purity filter is a gas-based spectral purity filter. As the name implies, a gas (e.g., $SF_4$ or Kr) is used to absorb IR light. The positive attributes of such a gas-based spectral purity filter is that it has a relatively high EUV transmission rate (about 80-90%), it is relatively good in terms of heat management and it is effective in blocking debris. The negative aspects of such a gas-based spectral purity filter are that it requires the use of a bulk processing chamber and gas turbulence may induce aberrations in the EUV light, which may result in reduced imaging quality in the resulting patterned layer of photoresist.

Another type of spectral purity filter is typically referred to as an ML Bragg grating spectral purity filter. An ML Bragg grating filter is typically comprised of multiple layers of $B_4C/Si$ and metal layers to absorb IR light. The positive attributes of such an ML Bragg grating filter is that it is physically small, it is effective at blocking IR radiation (IR transmission less than about 0.5% at 10.6 µm) and it is relatively good in terms of heat management. The negative aspect of such an ML Bragg grating filter is that it has a relatively low EUV transmission rate (about 45% at 13.5 nm).

Yet another type of spectral purity filter is typically referred to as a grid spectral purity filter. In a grid filter, a grid cell is used to block IR light. The positive attributes of such a grid filter is that it is physically small and it is effective at blocking IR radiation (IR transmission less than about 0.1% at 10.6 µm). The negative aspect of such a grid filter is that it has a relatively low EUV transmission rate (about 74% at 13.5 nm).

Another type of spectral purity filter is typically referred to as a blazed grating spectral purity filter. As the name implies, a blazed grating filter includes a blazed grating that is used to separate the EUV, IR and OoB wavelengths. The positive attributes of such a blazed grating filter is that it is one of the few types of filters wherein the IR and OoB wavelengths are blocked at the same time, it is physically small, it exhibits a low rate of transmission for both IR and OoB wavelengths, and it is relatively good in terms of heat management. The negative aspects of such a prior art blazed grating filter are that it has a relatively low EUV transmission rate (about 63% at 13.5 nm) and the fabrication of such a prior art blazed grating spectral purity filter is complex.

Yet another type of spectral purity filter is typically referred to as an OoB spectral purity filter. In an OoB filter, a free-standing foil or membrane is used to block OoB wavelength light. The positive attributes of such an OoB filter are that it is physically small and it exhibits a low rate of transmission for OoB wavelength light. The negative aspects of such an OoB filter are that it is very fragile, exhibits a relatively low EUV transmission rate (about 70% at 13.5 nm) and it is relatively poor in terms of heat management.

One prior art EUV system (manufactured by ASML) includes both a grid filter and an OoB filter. It is believed that this system has a relatively low EUV transmission rate (about 50% at 13.5 nm), it is very fragile (due to the foil in the OoB filter) and it is very expensive.

Figure 1:
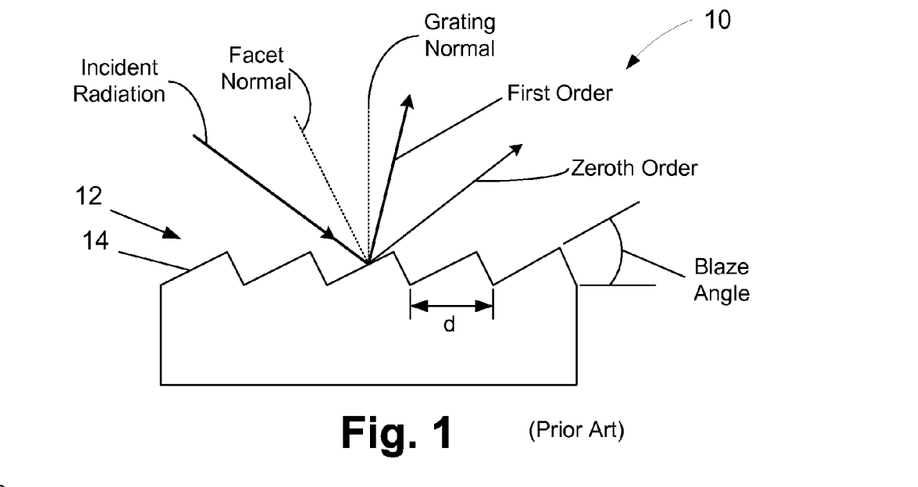
FIG. 1 depicts an illustrative embodiment of a prior art blazed grating structure.

FIG. 1 is a simplistic depiction of a prior art blazed grating filter 10. Such a blazed grating structure 10 may be a stand-alone device, or it may be fabricated into the surface of a mirror within an EUV system. As shown therein, the blazed grating filter 10 is comprised of a specially constructed "saw-toothed" shaped surface 12 that includes a plurality of facet surfaces 14 that have a specifically designed periodicity "d". Additionally, the facet surfaces 14 may be oriented at a specifically designed blaze angle, which may typically range from about 7-10° depending upon the particular application. The normal directions for the facet surfaces 14 and the blazed grating 10 are different, as noted in FIG. 1. The geometry and shape of surface 12 is designed such that incident radiation may be separated into various orders, with illustrative examples of the first order diffraction and the zeroth order diffraction depicted in FIG. 1.

Typically, such a prior art blazed grating filter 10 for use in an EUV system was formed by first fabricating the saw-toothed surface 12 into a substrate and thereafter depositing the various films that define the well-known multi-layer structure used in such filters onto the saw-toothed surface 12. In general, such prior art blazed grating filters 10 were fabricated in one of two ways: by etching the substrate or by using a so-called electron-beam lithography tool to cut the saw-toothed surfaces into the substrate. One illustrative example of a method of forming a blazed grating filter 10 using an etching process is described in an article by R. K. Heilmann et al. (Heilmann et al., "Advances in reflection grating technology for Constellation-X," Proc. of SPIE, 5168:271-82, 2004). The method generally involves the formation of a masking layer above the substrate, performing an etching process that exposes the <111> planes of the substrate, stripping the masking layer from the etched substrate, attaching a transparent template to the etched substrate (which acts as a mold) using a UV curable polymer material, curing the polymer material and removing the etched silicon mold. Such a manufacturing process is very complex and very time consuming. One example of a method of manufacturing a blazed grating filter using an electron-beam lithography tool is described in an article by P. P. Naulleau et al. (Naulleau et al., "Fabrication of high-efficiency multilayer-coated binary blazed gratings in the EUV regime," Optics Communications, 200:27-34, 2001). Another example of a method of manufacturing a blazed grating filter using an electron-beam lithography tool is described in an article by J. A. Liddle et al. (Liddle et al., "Nanoscale topography control for the fabrication of advanced diffractive optics," J. Vac. Sci. Technol. B, 21:2980, 2003). Manufacturing blazed grating filters using electron-beam lithography techniques has two primary problems. First, due to the nature of the electron-beam lithography tool, the surfaces are not as smooth as is desired and such surface roughness can cause errors in the diffraction of incident light. Moreover, such a manufacturing technique is time-consuming and expensive.

The present invention is directed to various embodiments of a novel blazed grating spectral purity filter and various methods of making such a filter that may reduce or eliminate one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various embodiments of a novel blazed grating spectral purity filter and various methods of making such a filter. In one example a blazed grating filter disclosed herein includes a substrate that has a substantially planar upper surface positioned in a first plane and a substantially planar bottom surface positioned in a second plane, wherein the first plane is oriented at an angle relative to the second plane that corresponds to a blaze angle of the blazed grating filter, a multilayer stack comprised of a plurality of multilayer pairs formed above the upper surface of the substrate, wherein an uppermost surface of the multilayer stack is positioned in a third plane that is oriented at substantially the blaze angle relative to the first plane, a plurality of recesses positioned in an upper portion of the multilayer stack and at least one capping layer positioned above at least the uppermost surface of the multilayer stack and above at least a bottom surface of each of the recesses.

In another example, a blazed grating filter disclosed herein includes a substrate that has a substantially planar upper surface positioned in a first plane and a substantially planar bottom surface positioned in a second plane, wherein the first plane is oriented at an angle relative to the second plane that corresponds to a blaze angle of the blazed grating filter, a multilayer stack comprised of a plurality of multilayer pairs formed above the upper surface of the substrate, wherein an uppermost surface of the multilayer stack is positioned in a third plane that is oriented substantially parallel to the second plane, and at least one capping layer positioned above at least the uppermost surface of the multilayer stack.

One illustrative method disclosed herein includes obtaining a substrate having a substantially planar planarized upper surface positioned in a first plane and a substantially planar bottom surface positioned in a second plane, wherein the first plane is oriented at an angle relative to the second plane that corresponds to a blaze angle of the blazed grating filter, forming a multilayer stack comprised of a plurality of multilayer pairs above the planarized upper surface of the substrate, wherein an uppermost surface of the multilayer stack is positioned in a third plane that is substantially parallel with the second plane, and forming a first capping layer above at least the uppermost surface of said multilayer stack.

In yet another illustrative example, a method disclosed herein includes obtaining a substrate in a condition whereby it has a substantially planar original upper surface that is positioned substantially parallel to a substantially planar back surface of the substrate, performing a chemical mechanical planarization process on the original upper surface of the substrate so as to thereby define a substantially planar planarized upper surface that is positioned in a first plane, wherein the first plane is oriented at an angle relative to a second plane that contains the substantially planar back surface and wherein the angle corresponds to a blaze angle of the blazed grating filter, forming a multilayer stack comprised of a plurality of multilayer pairs formed above the planarized upper surface of the substrate, wherein an uppermost surface of the multilayer stack is positioned in a third plane that is substantially parallel with the second plane, forming a first capping layer above the uppermost surface of the multilayer stack, forming a patterned etch mask above the first capping layer, performing at least one etching process through the patterned etch mask to thereby define a patterned first capping layer and a plurality of recesses that extend into the multilayer stack, and forming a second capping layer above the patterned first capping layer and above at least a bottom surface of each of the plurality of recesses.

Yet another illustrative method disclosed herein for forming a blazed grating filter includes performing at least one process operation in a chemical mechanical polishing tool on a substantially planar upper surface of a substrate to define a saw-toothed upper surface 102R (see FIG. 3B) comprised of a plurality of saw-toothed shaped features formed in the substrate, wherein the saw-toothed shaped features have a first surface and a second surface, wherein a first plane containing the first surface is oriented substantially normal to a plane containing the substantially planar upper surface of the substrate and a second plane containing the second surface is oriented at an angle with respect to the plane that corresponds to a blaze angle of the blazed grating filter. In this embodiment, the method also includes forming a multilayer stack comprised of a plurality of multilayer pairs above the saw-toothed upper surface of the substrate and forming a capping layer above the multilayer stack.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present disclosure is directed to various embodiments of a novel blazed grating spectral purity filter and various methods of making such a filter. In one aspect, the filters disclosed herein may be used in EUV photolithography systems. Accordingly, the filters disclosed herein may be employed in connection with the fabrication of a variety of devices, including, but not limited to, semiconductor devices, such as logic devices, memory devices, nano-optical devices, etc. However, the inventions disclosed herein are not limited to use with only EUV systems. Rather, as will be appreciated by those skilled in the art after a complete reading of the present application, the filters disclosed herein may be employed in other applications, such as, for example, astronomy (telescopes), synchrotron radiation sources for use in condensed matter physics, pharmaceutical research and structural biology, free-electron laser optics, etc. Thus, the presently disclosed inventions should not be considered to be limited to the illustrative examples disclosed herein. Moreover, the blazed grating spectral purity filters disclosed herein may be implemented as a stand-alone device, or it may be fabricated into the surface of a mirror or other structure in the system in which it is employed. With reference to the attached figures, various illustrative embodiments of the devices and methods disclosed herein will now be described in more detail.

Figure 2A:
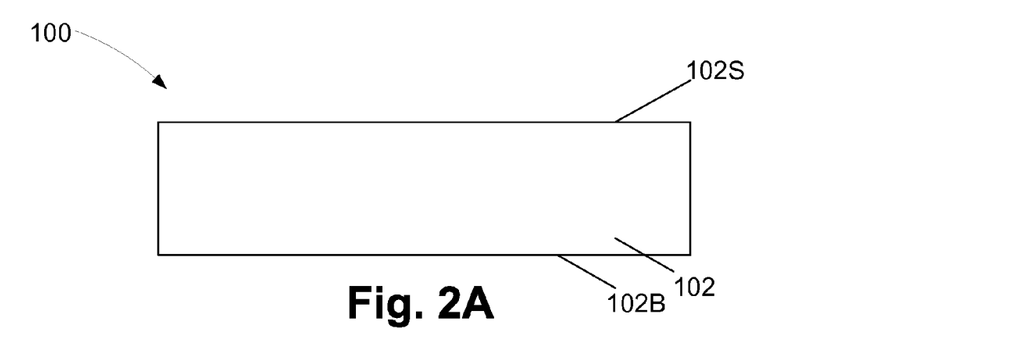
FIGS. 2A-2H depict one illustrative embodiment of a novel blazed grating spectral purity filter disclosed herein and an illustrative technique for making such a filter.

FIGS. 2A-2H depict one illustrative embodiment of a novel blazed grating spectral purity filter 100 disclosed herein and an illustrative technique for making such a filter 100. FIG. 2A is a cross-sectional view of an illustrative substrate 102 that has a substantially planar top surface 102S and a substantially planar back surface 102B. The substrate 102 is intended to be representative of any type of material known in the art wherein a blazed grating structure may be formed in such a material for purposes of filtering incident radiation. For example, the substrate 102 may be comprised quartz, metal or a low thermal expansion material (LTEM), such as ULE glass, etc., and its starting thickness may vary depending upon the particular application. The substrate 102 depicted herein may be a single uniform structure comprised of the substrate material or it may be a "cladding" type layer formed above another structure (not shown). In one particular embodiment, the substrate 102 may be made of quartz and it may have an overall starting thickness of about 5-100 mm.

Figure 2B:
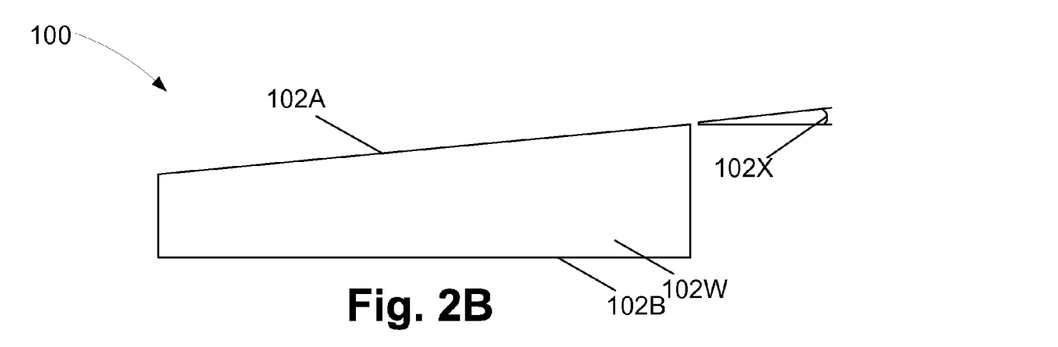

FIG. 2B depicts the device 100 after a planarization process, e.g., a chemical mechanical planarization (CMP) process, has been performed on the upper surface 102S of the substrate 102 to thereby produce a wedge-shaped substrate 102W having a substantially planar angled surface 102A. The angled surface 102A is oriented at an angle 102X that, as described more fully below, will correspond to the blaze angle of the blazed grating spectral purity filter 100 disclosed herein. The magnitude of the angle 102X may vary depending upon the particular application. For example, the angle 102X may fall within the range of about 0.1-30° relative to the original horizontal upper surface 102S of the substrate 102. Of course, if desired, the angled surface 102A could have been formed in the back surface 102B of the substrate 102. In one embodiment, the angled surface 102A may be formed by positioning the original substrate 102 in a CMP tool in a chuck (not shown) such that the upper surface 102S is tilted at the desired angle 102X. Thereafter, the polishing head in the CMP tool may be urged downward until such time as the angled surface 102A is formed. Alternatively, the substrate 102 could be positioned in the CMP tool in such a manner that the upper surface 102S of the original substrate 102 is oriented substantially horizontally in the CMP tool. Thereafter, the polishing head or platen may be tilted at the desired angle 102X and the polishing process may be performed to form the angled surface 102A.

Figure 2C:
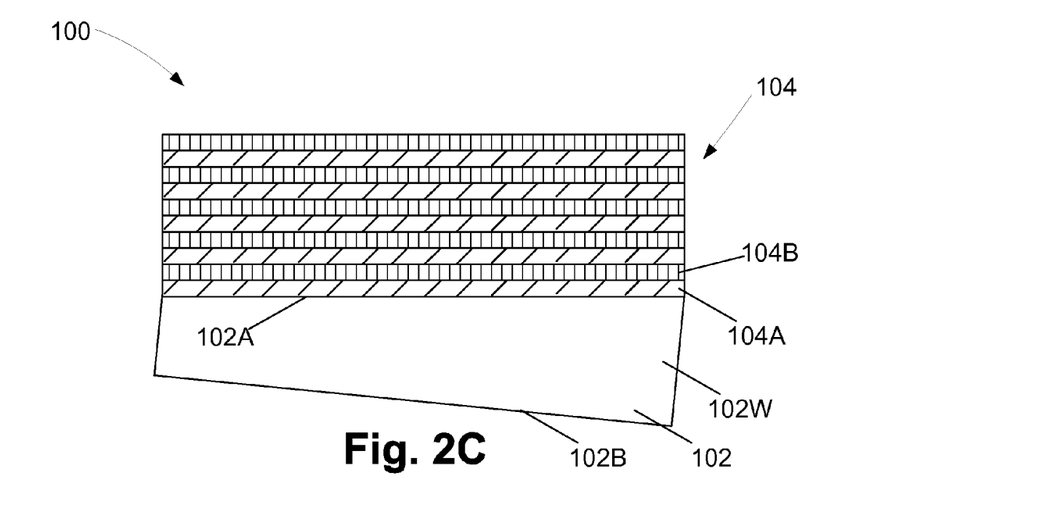
Figure 2D:
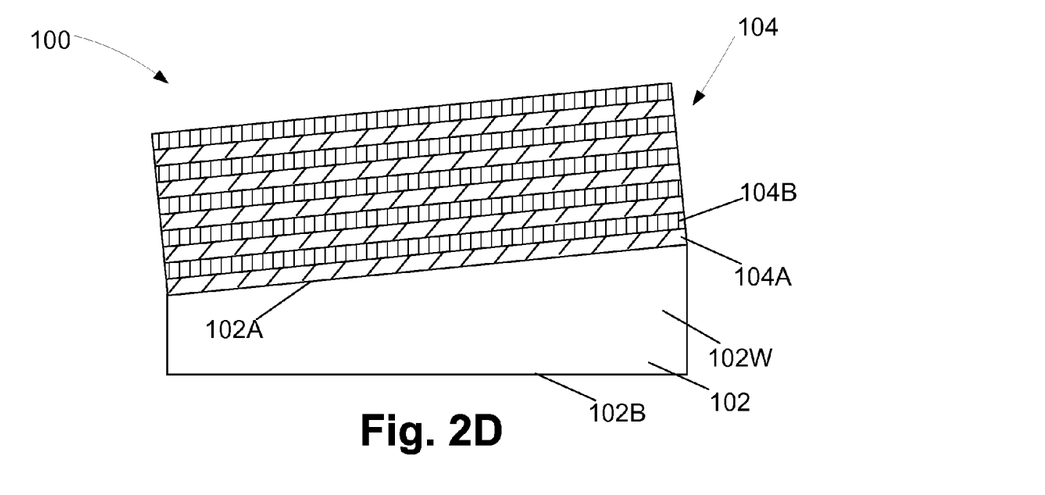

With reference to FIGS. 2C-2D, the next process operation involves the formation of a multilayer film stack 104 above the angled surface 102A of the substrate 102W. The multilayer stack 104 is comprised of a plurality of multilayer pairs, wherein each multilayer pair is comprised of a first layer 104A and a second layer 104B. In one example, the first layer 104A may be a layer of molybdenum (Mo) and the second layer 104B may be a layer of silicon (Si). In another example, another layer of material (not shown) may be inserted between a first layer 104A comprised of molybdenum (Mo) and a second layer 104B comprised of silicon. Other material combinations that may be used for the layers 104A and 104B layer include, but are not limited to, LaN/B or La/B4C or LaN/B or LaN/B4C. The lanthanum embodiments may be well-suited for EUV energies in the 6 nm wavelength range.

Depending upon the particular application, the blazed grating spectral purity filter 100 disclosed herein may include many of such multilayer pairs, as discussed more fully below. The thickness of the layers 104A, 104B is established such that incident light is reflected—in phase—from each of the interfaces in the multilayer stack 104. Based upon the theory of optical interference, the thicknesses of the layers 104A, 104B are specified so that the phases of the reflecting light waves that reflect from the interface between the two layers coincide with each other. In one embodiment, the thickness of the layer 104B when it is made of silicon may be about 4 nm, and the thickness of the layer 104A when it is made of molybdenum may be about 3 nm, thereby resulting in a combined thickness of the pair of layers 104A/104B of about 7 nm. In another embodiment, the layer 104B may be a layer of silicon having a thickness of about 4.16 nm, and the layer 104A may be a layer of molybdenum having a thickness of about 2.77 nm.

In the embodiment depicted in FIG. 2C, the substrate 102W is positioned in one or more deposition tools such that the angled surface 102A is oriented substantially horizontally in the deposition tool. Once the substrate 102W is so positioned, the various layers 104A, 104B may be sequentially deposited above the substrate 102W. As with the above-described planarization process, in one embodiment, the angled surface 102A may be oriented substantially horizontally in the deposition tool by positioning the wedge-shaped substrate 102W in a chuck (not shown). In the embodiment depicted in FIG. 2D, the substrate 102W is positioned in one or more deposition tools such that the angled surface 102A is tilted relative to the horizontal. Stated another way, the substantially planar back surface 102B of the substrate 102W is positioned such that it is oriented substantially horizontally in the deposition tool. Once the substrate 102W is positioned in the deposition tool as depicted in FIG. 2D, the various layers 104A, 104B may be sequentially deposited above the substrate 102W.

Figure 2E:
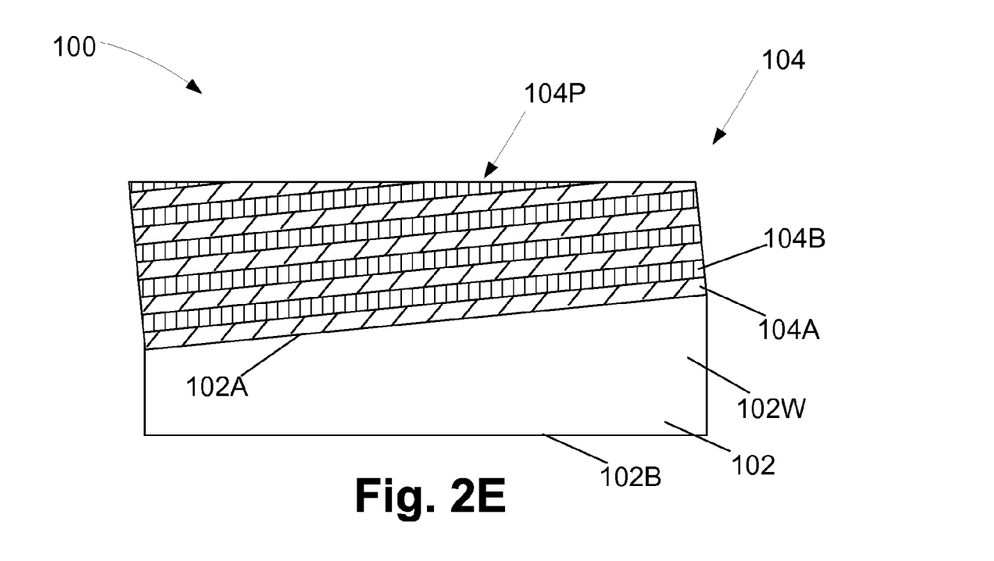

FIG. 2E depicts the device 100 after a planarization process, e.g., a chemical mechanical planarization (CMP) process, has been performed on the upper surface 104P of the multilayer stack 104 such that the upper surface 104P is oriented substantially horizontally. Stated another way, after the planarization process is performed, the planarized upper surface 104P of the multilayer stack 104 is substantially parallel with the substantially planar back surface 102B of the wedge-shaped substrate 102W. In one embodiment, the planarized upper surface 104P of the multilayer stack 104 may be formed by positioning the substrate 102W in the CMP tool such that the substantially planar back surface 102B of the substrate 102W is oriented substantially horizontally in the CMP tool. Thereafter, the polishing head in the CMP tool may be urged vertically downward until such time as the planarized upper surface 104P of the multilayer stack 104 is formed.

Figure 2F:
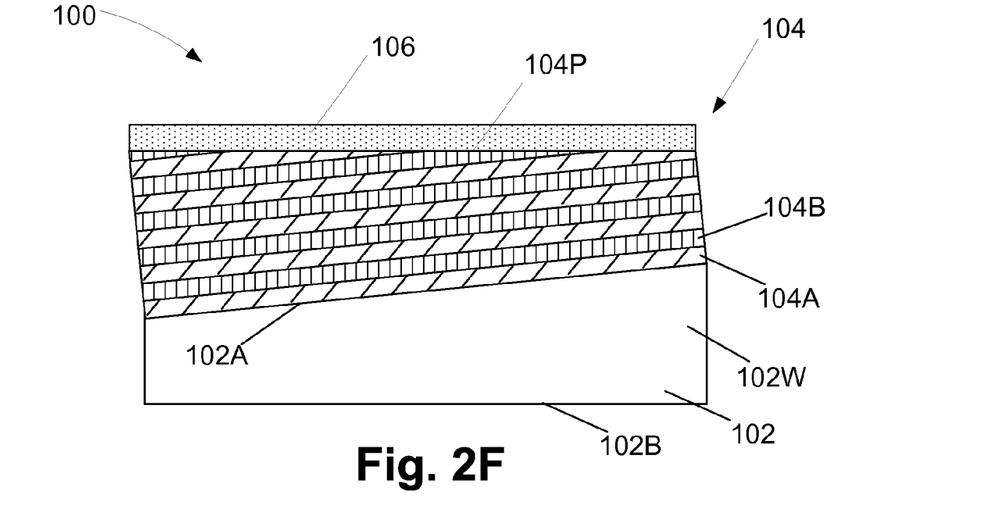

FIG. 2F depicts the blazed grating spectral purity filter 100 disclosed herein after an illustrative capping layer 106 has been formed above the planarized upper surface 104P of the multilayer stack 104. The capping layer 106 is typically provided to make the blazed grating filter 100 disclosed herein more chemically stable and more durable during use. In one illustrative embodiment, the capping layer 106 may be a layer of ruthenium having a thickness that falls within the range of about 2-30 nm.

Figure 2G:
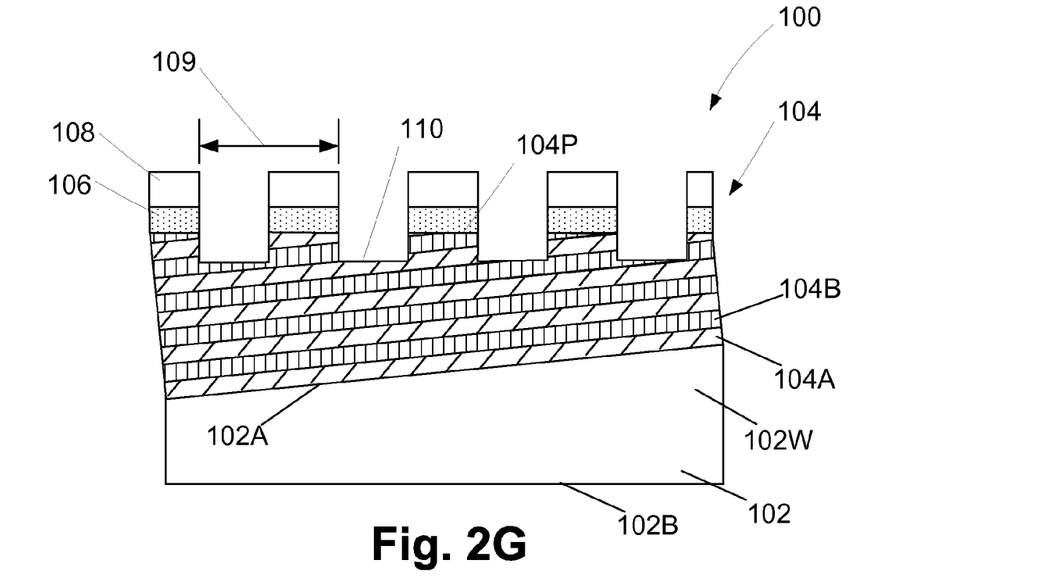

FIG. 2G depicts the blazed grating spectral purity filter 100 disclosed herein after several process operations were performed. First, a patterned masking layer 108 was formed above the filter 100. In one embodiment, the patterned masking layer 108 may be a patterned layer of photoresist material that may be formed using known photolithography tools and techniques. Thereafter, one or more dry or wet etching processes were performed to etch cavities or recesses 110 in the multilayer stack 104. The depth of the cavities 110 may vary depending upon the particular application, e.g., 5-300 nm. The cavities have a pitch 109 that corresponds to the periodicity ("d") of the filter 100. The magnitude of the pitch 109 may vary depending upon the particular application, e.g., 10-1000000 nm.

Figure 2H:
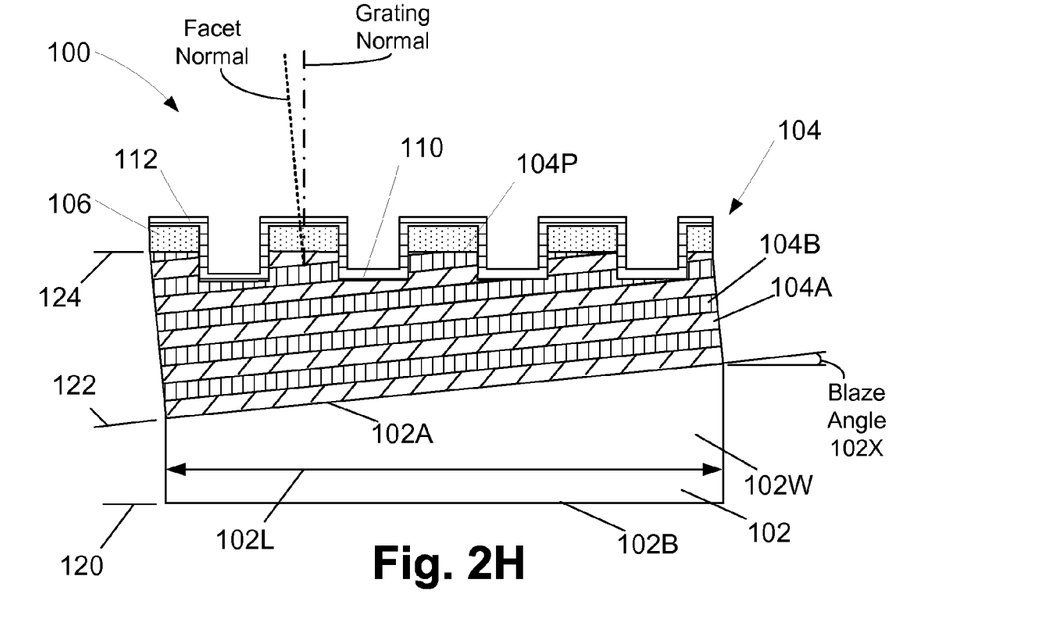

FIG. 2H depicts the blazed grating spectral purity filter 100 disclosed herein after a layer of capping material 112 is formed above the previously patterned layer of capping material 106. The capping layer 112 is provided to protect the exposed multilayer materials within the cavities. In the depicted example, the layer 112 is shaded with different cross-hatching than that of the capping layer 106 so that the additional layer 112 can be readily identified in the attached drawings. In practice, the layer of capping material 112 may be made of the same material as that of the capping layer 106 or it may be made of a different material. In one illustrative embodiment, both of the layers 106, 112 are made of ruthenium or silicon dioxide. The thickness of the layer 112 may fall within the range of about 2-30 nm, depending upon the particular application.

With continuing reference to FIG. 2H, normal directions of the multilayer facet and the grating are depicted. As noted previously, the blazed angle of the filter 100 is determined by the angle 102X of the angled surface 102A of the wedge-shaped substrate 102W. In this embodiment, no absorber material is used. As will be appreciated by those skilled in the art after a complete reading of the present application, the grating is a phase-shifted grating. The amount or magnitude of the phase shift may vary depending upon the particular application. For example, in some applications, a phase shift of about 180° may be desirable. Of course, other phase shifts may also be acceptable depending upon the diffraction efficiency that is acceptable in a particular application. The phase shift produced by the novel blazed grating spectral purity filter 100 disclosed herein will need to be determined empirically for each unique embodiment of the filter 100, e.g., the number of multilayer pairs that are used, the thickness and materials of construction of such multilayer pairs, etc. In one example, the phase shift produced by the filter 100 may be correlated to the depth of the cavities 110, which may be controlled by performing a timed etching process to form the cavities 110 in the multilayer stack 104.

As will be appreciated by those skilled in the art after a complete reading of the present application, the novel filter 100 disclosed herein provides several advantages relative to at least some of the prior art filters discussed in the background section of this application. For example, the filter 100 disclosed herein may be employed to block IR and OoB radiation simultaneously. Theoretically, zero IR and OoB transmission is possible. Depending upon the particular application, the EUV transmission may be about 63% or larger. This is believed to be a larger EUV transmission rate than that of the prior art EUV system (manufactured by ASML) that includes both a grid filter and an OoB filter. Good heat management can be achieved using the filter 100 disclosed herein as existing EUV mirror cooling systems can be used with the filter 100. Perhaps most importantly, the filter 100 disclosed herein has a simple structure that is easier to fabricate than at least some of the prior art filters discussed in the background section of the present application. That is, conventional semiconductor CMP, lithography and etching technology may be used to manufacture the filter 100. Accordingly, the filter 100 disclosed herein may be produced at a relatively lower cost.

As will be appreciated by those skilled in the art after a complete reading of the present application, various novel methods and devices are disclosed herein. With reference to FIG. 2H, one example of a blazed grating filter 100 disclosed herein includes a substrate 102W that has a substantially planar upper surface 102A positioned in a first plane 122 and a substantially planar bottom surface 102B positioned in a second plane 120, wherein the first plane 122 is oriented at an angle 102X relative to the second plane 120 that corresponds to a blaze angle 102X of the blazed grating filter 100, a multilayer stack 104 comprised of a plurality of multilayer pairs (104A, 104B) positioned above the upper surface 102A of the substrate 102W, wherein an uppermost surface 104P of the multilayer stack 104 is positioned in a third plane 124 that is oriented at substantially the blaze angle 102X relative to the first plane 122, a plurality of recesses 110 positioned in an upper portion of the multilayer stack 104 and at least one capping layer (106/112) positioned above at least the uppermost surface 104P of the multilayer stack 104 and above at least a bottom surface of each of the recesses 110.

Another example of a blazed grating filter 100 disclosed herein includes a substrate 102W that has a substantially planar upper surface 102A positioned in a first plane 122 and a substantially planar bottom surface 102B positioned in a second plane 120, wherein the first plane 122 is oriented at an angle 102X relative to the second plane 120 that corresponds to a blaze angle 102X of the blazed grating filter 104, a multilayer stack 104 comprised of a plurality of multilayer pairs (104A, 104B) positioned above the upper surface 102A of the substrate 102W, wherein an uppermost surface 104P of the multilayer stack 104 is positioned in a third plane 124 that is oriented substantially parallel to the second plane 120, and at least one capping layer (106, 112) positioned above at least the uppermost surface 104P of the multilayer stack 104.

One illustrative method disclosed herein includes obtaining a substrate 102W having a substantially planar planarized upper surface 102A positioned in a first plane 122 and a substantially planar bottom surface 102B positioned in a second plane 120, wherein the first plane 122 is oriented at an angle 102X relative to the second plane 120 that corresponds to a blaze angle 102X of the blazed grating filter 100, forming a multilayer stack 104 comprised of a plurality of multilayer pairs (104A, 104B) above the planarized upper surface 102A of the substrate 102W, wherein an uppermost surface 104P of the multilayer stack 104 is positioned in a third plane 124 that is substantially parallel with the second plane 120, and forming a first capping layer 106 above at least the uppermost surface 104P of the multilayer stack 104.

In yet another illustrative example, a method disclosed herein includes obtaining a substrate 102 in a condition whereby it has a substantially planar original upper surface 102S (see FIG. 2A) that is positioned substantially parallel to a substantially planar back surface 102B of the substrate 102, performing a chemical mechanical planarization process on the original upper surface 102S of the substrate 102 so as to thereby define a substantially planar planarized upper surface 102A that is positioned in a first plane 122, wherein the first plane 122 is oriented at an angle 102X relative to a second plane 120 that contains the substantially planar back surface 120 and wherein the angle 102X corresponds to a blaze angle of the blazed grating filter 100, forming a multilayer stack 104 comprised of a plurality of multilayer pairs (104A, 104B) above the planarized upper surface 102A of the substrate 102W, wherein an uppermost surface 104P of the multilayer stack 104 is positioned in a third plane 124 that is substantially parallel with the second plane 120, forming a first capping layer 106 above the uppermost surface 104P of the multilayer stack 104, forming a patterned etch mask 108 above the first capping layer 106, performing at least one etching process through the patterned etch mask 108 to thereby define a patterned first capping layer and a plurality of recesses 110 that extend into the multilayer stack 104, and forming a second capping layer 112 above the patterned first capping layer and above at least a bottom surface of each of the plurality of recesses 110.

In some applications, depending upon the length 102L (see FIG. 2H) of the substrate 102W, the filter 100 disclosed herein may require that the multilayer stack 104 be comprised of thousands of multilayer pairs. For example, assuming that the dimension 102L is equal to 5 cm and the blazed angle 120X is very small, e.g., about 0.1°, then the filter 100 would need to be formed with more than twelve thousand multilayer pairs. Although the manufacturing of the filter 100 disclosed herein that may require such a large number of multilayer pairs would typically not be a "bottleneck" in production activities, the formation of so many layers of materials may take several days.

Figure 3A:
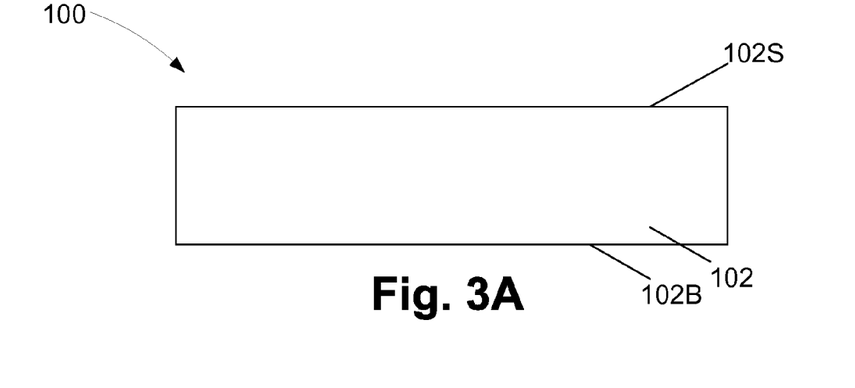
FIG. 3A-3B depict another illustrative embodiment of a novel blazed grating spectral purity filter disclosed herein and another illustrative technique for making such a filter.
Figure 3B:
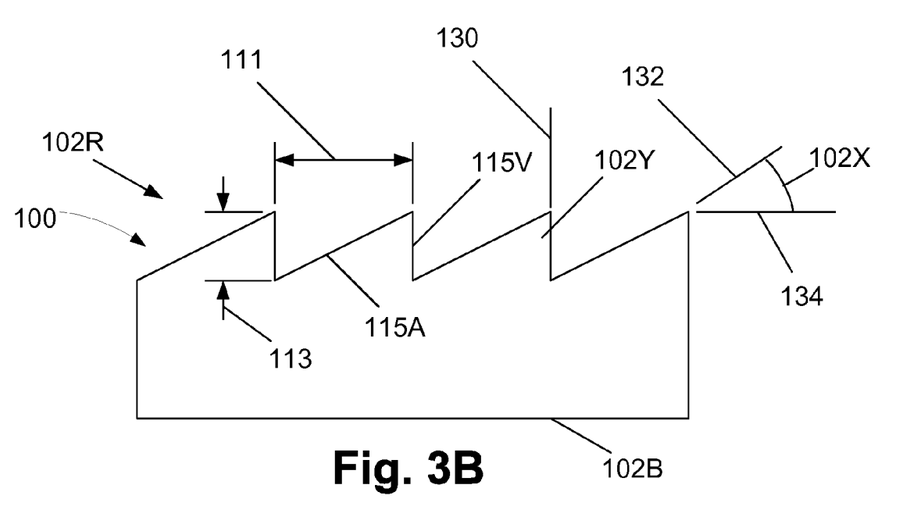

However, if the filter 100 is manufactured such that the period or pitch between adjunct saw-toothed structures is reduced, then the number of multilayer pairs may be significantly reduced. Accordingly, FIGS. 3A-3B depict another illustrative embodiment of a novel blazed grating spectral purity filter 100 disclosed herein and another illustrative technique for making such a filter 100. As shown in FIG. 3A, the process is performed on the above-described substrate 102 that has a substantially planar top surface 102S and a substantially planar back surface 102B.

FIG. 3B depicts the device 100 after one or more process operations were performed on the upper surface 102S of the substrate 102 to thereby define a saw-toothed shaped surface 102R comprised of a plurality of saw-toothed shaped features 102Y. The saw-toothed shaped features 102Y have a substantially vertically oriented surface 115V and an angled surface 115A that is angled at the desired blaze angle 102X. The saw-toothed shaped features 102Y are formed on a certain pitch 111 and they have a maximum height 113 of about 100 nm-10 cm. In one embodiment, the period or pitch 111 between the features 102Y may be as small as possible since the smaller the pitch 111, the fewer number of multilayer pairs that will be required to form the filter 100. In one embodiment, the pitch 111 may be about 1-5 cm. For example, if the pitch 111 is about 1 cm, then the number of multilayer pairs that will be required to form the filter 100 may be reduced to about 2500. In one embodiment, the saw-tooth shaped features 102Y may be formed by using a CMP tool wherein the substrate 102 is oriented in the CMP tool at a desired angle so as to form the angled surfaces 115A of the saw-tooth shaped features 102Y. If the pitch 111 is too small to be formed by performing a traditional CMP process, then the edge of the CMP plate (to which a polishing pad may be attached) may be used to form the saw-toothed shaped features 102Y. The features 102Y can also be formed using an e-beam etching tool. Additionally, by reducing the angle 102X, the number of multilayer pairs required may be reduced. Importantly, even at very small blaze angles 120X, the filter 100 disclosed herein may be employed to achieve large spatial separations. At the point of processing depicted in FIG. 3B, the required number of multilayer pairs (104A, 104B) and the capping layer 106 would be formed above the saw-toothed shaped features 102Y formed in the substrate 102. Thereafter, the recesses 110 and the additional capping layer 112 would be formed as described above.

With reference to FIG. 3B, as will be appreciated by those skilled in the art after a complete reading of the present application, another illustrative method is disclosed herein for forming a blazed grating filter 100. In this example, the method includes performing at least one process operation in a chemical mechanical polishing tool or an e-beam etching tool on a substantially planar upper surface 102S of a substrate 102 to define a saw-toothed upper surface 102R comprised of a plurality of saw-toothed shaped features 102Y formed in the substrate 102, wherein the saw-toothed shaped features 102Y have a first surface 115V and a second surface 115A, wherein a first plane 130 containing the first surface 115V is oriented substantially normal to a plane 134 containing the substantially planar upper surface of the substrate 102 and a second plane 132 containing the second surface 115A is oriented at an angle 102X with respect to the plane 132 that corresponds to a blaze angle 102X of the blazed grating filter 100. In this embodiment, the method also includes forming a multilayer stack 104 comprised of a plurality of multilayer pairs (104A, 104B) above the saw-toothed upper surface 102R of the substrate 102 and forming a capping layer above the multilayer stack 104.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A blazed grating filter, comprising:
    a substrate, said substrate having a substantially planar upper surface positioned in a first plane and a substantially planar bottom surface positioned in a second plane, wherein said first plane is oriented at an angle relative to said second plane and wherein said angle corresponds to a blaze angle of said blazed grating filter;
a multilayer stack comprised of a plurality of multilayer pairs positioned above said upper surface of said substrate, wherein an uppermost surface of said multilayer stack is positioned in a third plane that is substantially parallel with said second plane;
a plurality of recesses positioned in an upper portion of said multilayer stack; and
at least one capping layer positioned above at least said uppermost surface of said multilayer stack and above at least a bottom surface of each of said recesses.

2. The filter of claim 1, wherein each of said recesses has a depth that falls within the range of about 5-300 nm.

3. The filter of claim 1, wherein said at least one capping layer is comprised of ruthenium or silicon dioxide.

4. The filter of claim 1, wherein said third plane containing said uppermost surface of said multilayer stack is positioned at substantially said angle relative to said first plane containing said upper surface of said substrate.

5. The filter of claim 1, wherein said filter is adapted to filter EUV radiation.

6. The filter of claim 1, wherein said blaze angle falls within the range of 0.1-30 degrees.

7. The filter of claim 1, wherein said filter comprises at least 1000 of said multi-layer pairs.

8. The filter of claim 1, wherein said at least one capping layer comprises a first capping layer and second capping layer, said first capping layer being positioned above said uppermost surface of said multilayer stack, each of said plurality of recesses extending through said first capping layer and into said upper portion of said multilayer stack, and said second capping layer being positioned above an upper surface of said first capping layer and above said bottom surface of each of said plurality of recesses.

9. The filter of claim 8, wherein said first capping layer is positioned above said uppermost surface of said multilayer stack, wherein each of said plurality of recesses extends through said first capping layer and into said upper portion of said multilayer stack, and wherein said second capping layer is positioned above an upper surface of said first capping layer and above said bottom surface of each of said plurality of recesses.

10. The filter of claim 1, wherein said at least one capping layer comprises a first capping layer and second capping layer.

11. The filter of claim 1, wherein an entire upper surface of said substrate is a substantially planar surface that is positioned in said first plane and wherein an entire bottom surface of said substrate is a substantially planar surface that is positioned in said second plane.

12. The filter of claim 1, wherein each pair of said plurality of multilayer pairs comprises a first layer positioned above a second layer.

13. The filter of claim 12, wherein a third layer is positioned between said first and second layers of each pair of said plurality of multilayer pairs.

14. The filter of claim 12, wherein said first layer comprises one of molybdenum and lanthanum and said second layer comprises one of silicon and boron.

15. A blazed grating filter, comprising:
a substrate, said substrate having a substantially planar upper surface positioned in a first plane and a substantially planar bottom surface positioned in a second plane, wherein said first plane is oriented at an angle relative to said second plane and wherein said angle corresponds to a blaze angle of said blazed grating filter;
a multilayer stack comprised of a plurality of multilayer pairs positioned above said upper surface of said substrate, wherein an uppermost surface of said multilayer stack is positioned in a third plane, wherein said third plane is substantially parallel with said second plane and oriented at substantially said angle relative to said first plane;
a plurality of recesses positioned in an upper portion of said multilayer stack; and
at least one capping layer positioned above at least said uppermost surface of said multilayer stack and above at least a bottom surface of each of said recesses.

16. The filter of claim 15, wherein a bottom surface of each of said plurality of recesses is positioned in a fourth plane and said fourth plane is substantially parallel with said second plane.

17. The filter of claim 15, wherein each of said recesses has a depth that falls within the range of about 5-300 nm.

18. The filter of claim 15, wherein said filter is adapted to filter EUV radiation.

19. The filter of claim 15, wherein an entire upper surface of said substrate is a substantially planar surface that is positioned in said first plane and wherein an entire bottom surface of said substrate is a substantially planar surface that is positioned in said second plane.

20. The filter of claim 15, wherein each pair of said plurality of multilayer pairs comprises a first layer positioned above a second layer, said first layer comprising one of molybdenum and lanthanum and said second layer comprising one of silicon and boron.

21. The filter of claim 20, wherein a third layer is positioned between said first and second layers of each pair of said plurality of multilayer pairs.

22. A blazed grating filter, comprising:
a substrate, wherein an entirety of said substrate has a substantially planar upper surface positioned in a first plane and a substantially planar bottom surface positioned in a second plane that is oriented at an angle relative to said first plane, said angle corresponding to a blaze angle of said blazed grating filter;
a multilayer stack comprising a plurality of multilayer pairs positioned above said upper surface of said substrate, wherein an uppermost surface of said multilayer stack is positioned in a third plane that is substantially parallel to said second plane;
a first capping layer positioned above said uppermost surface of said multilayer stack;
a plurality of recesses positioned in an upper portion of said multilayer stack, each of said plurality of recesses extending through said first capping layer and into said upper portion of said multilayer stack; and
a second capping layer positioned above a bottom surface of each of said plurality of recesses, wherein said second capping layer extends continuously over and covers said uppermost surface of said multilayer stack, sidewall surfaces of each of said plurality of recesses, and said bottom surface of each of said plurality of recesses.

* * * * *